Figure 1:
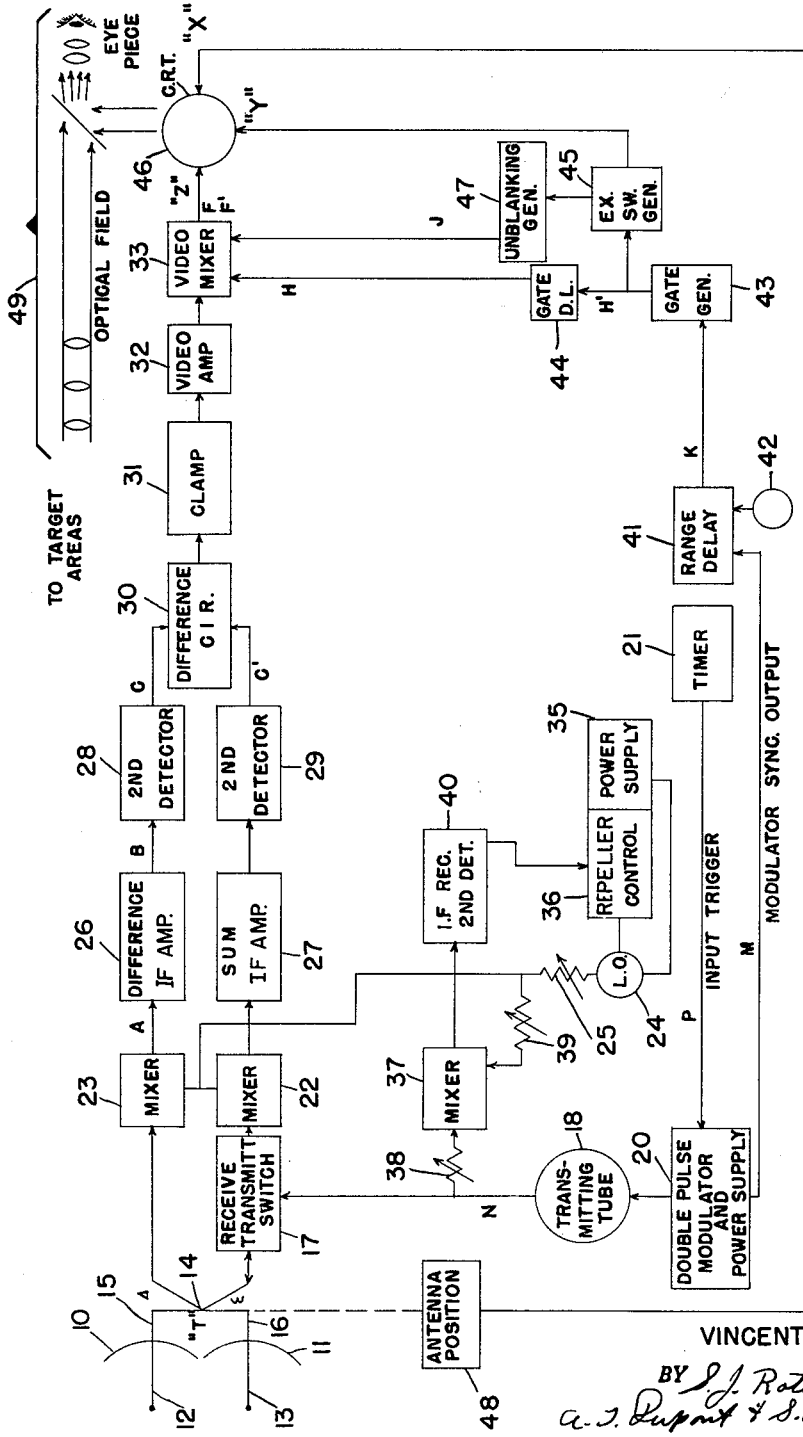

FIG. I.

INVENTOR.
VINCENT D. STABILITO

Σ – SUM
Δ – DIFFERENCE PATTERN

Jan. 26, 1965  V. D. STABILITO  3,167,765
PHASE-COMPARISON MONOPULSE RADAR
Filed June 13, 1961  4 Sheets-Sheet 3
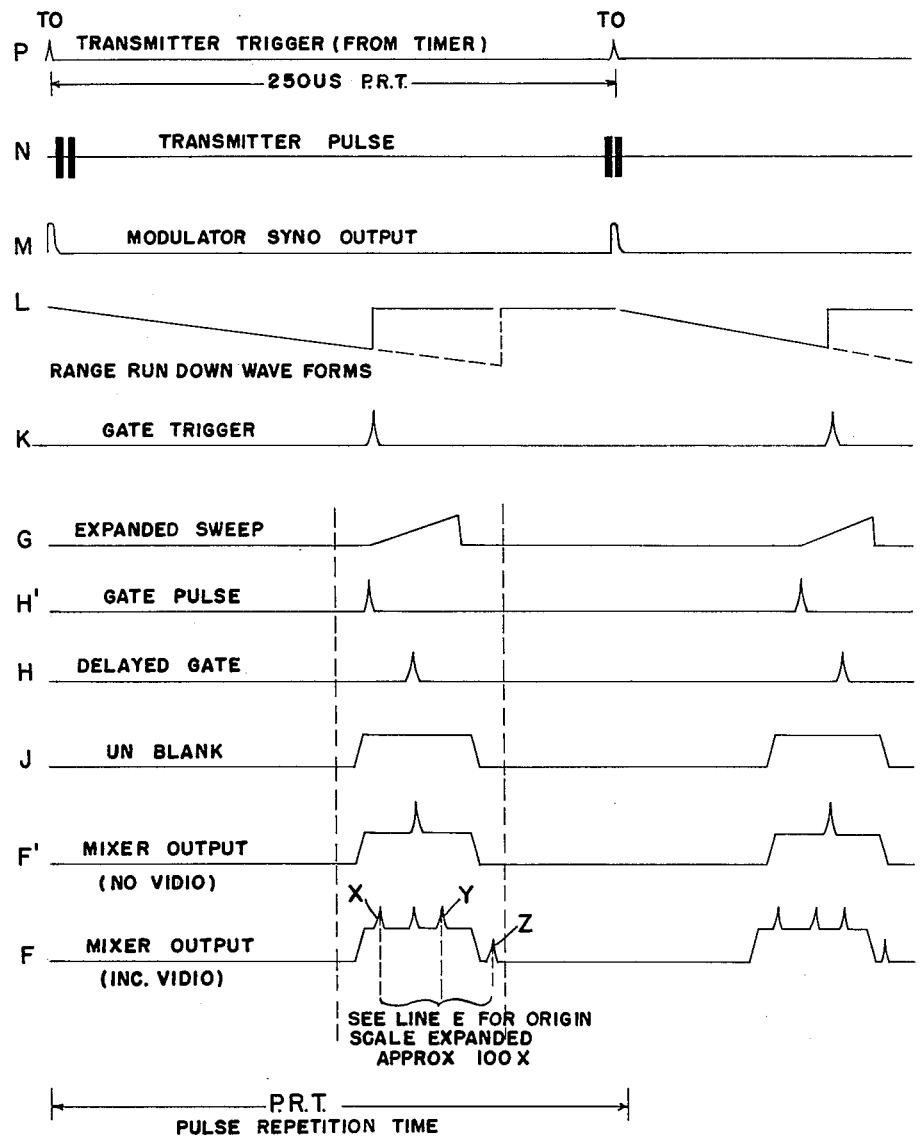
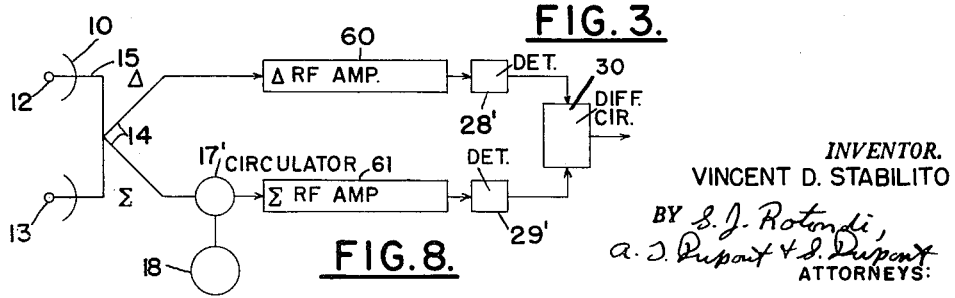

APPROXIMATE LOCATION OF I.F. BAND WIDTH WITH RESPECT TO DOUBLE PULSE SPECTRUM

United States Patent Office 3,167,765
Patented Jan. 26, 1965

3,167,765
PHASE-COMPARISON MONOPULSE RADAR
Vincent D. Stabilito, Riverside, N.J., assignor to the United States of America as represented by the Secretary of the Army
Filed June 13, 1961, Ser. No. 116,889
3 Claims. (Cl. 343—11)
(Granted under Title 35, U.S. Code (1952), sec. 266)

The invention described herein may be manufactured and used by or for the Government for governmental purposes without the payment to me of any royalty thereon.

The present invention relates to radar systems, and more particularly to a phase-comparison monopulse radar system which possesses a target discriminating ability not heretofore realized.

No radar system heretofore available can distinguish between stationary targets and clutter such as that produced by vegetation. The ability of such systems to discriminate between a target and its clutter environment has proved inadequate for ranging under practical field conditions. Another limitation of these conventional systems is their inability to point accurately at the major target object when there is more than one target at the same range located in the beam width. As a result, considerable time and skill has been required for a trained operator to exercise his best judgment in detecting a target in clutter and discerning the right target from all the target returns appearing on the display.

The present invention avoids these difficulties by the provision of a radar system which involves the transmission of a multipulse signal, an antenna system which permits extracting the phase relation between the reflected signals arriving at the antenna thereby creating sum and difference signals, an offset local oscillator which provides single side band reception, and a circuit which provides a comparison of the sum and difference signals instantaneous amplitude.

Briefly stated, this radar system includes an antenna system consisting of two paraboloids with their feed centers at the same elevation and displaced in azimuth to provide phase comparison of the reflected sum and difference signals. The transmitted signal is preferably in the form of two pulses which are of equal length and are separated by a time interval equal to that of one of the pulses. This signal is transmitted to the antenna through a duplexer or transmit-receive circuit and the sum arm of a magic tee. The signals reflected from the targets to the antenna system are divided in accordance with their instaneous R.F. phase into sum and difference signals. The $\Sigma$ and $\Delta$ signals are separately combined with the output of a local oscillator which is offset to provide single side band reception. These signals are thereafter separately amplified in IF amplifiers set for a relatively narrow band pass, are separately detected, and are compared to provide a resultant sum or difference which is indicative of the divergence of the electrical axis of the antenna system from the target.

The invention will be better understood from the following description when considered in connection with the accompanying drawings and its scope as indicated by the appended claims.

Figure 2:
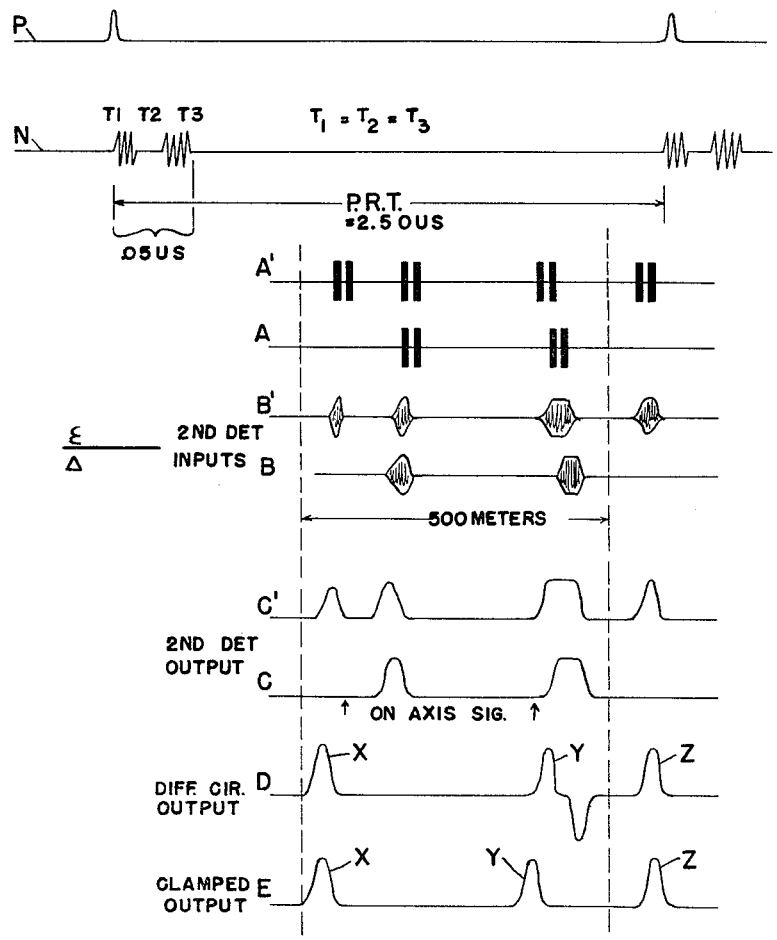
Figure 4:
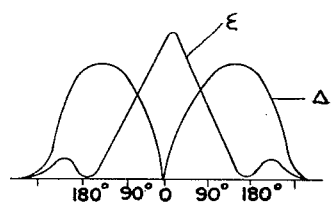
Figure 5:
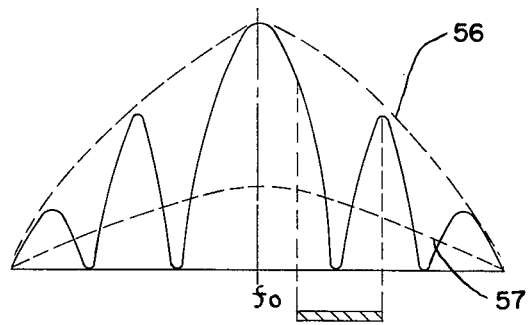
Figure 7:
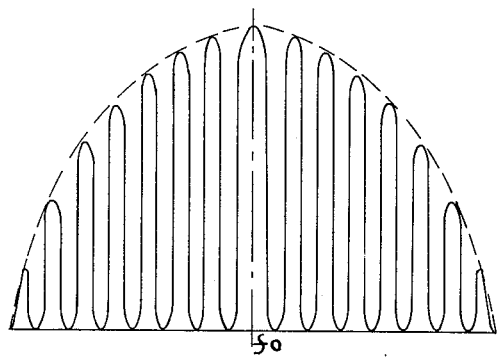
Figure 6:
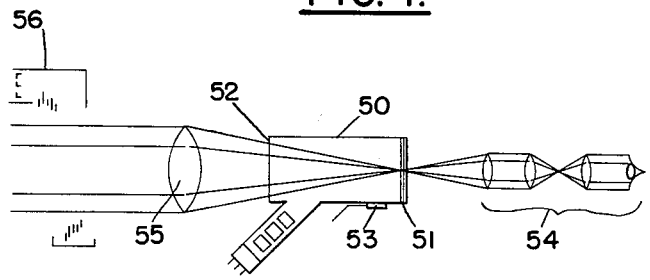

Referring to the drawings:

FIG. 1 is a box diagram indicating the relation between the various components of the phase-comparison monopulse radar system of the present invention, FIG. 2 indicates the characters of the signals at various points in the transmitting and receiving elements of the radar system, FIG. 3 pertains to the various signals in the timing elements of the system, FIG. 4 represents a relation between the sum and difference signals out of the antenna system as a function of relative incident R.F. phase angle and FIG. 5 is an explanatory diagram, FIG. 6 illustrates a modification of the target selecting means, FIG. 7 is an explanatory diagram, and FIG. 8 is a box diagram illustrating a modified form of the invention.

The radar system illustrated by FIG. 1 includes a dual paraboloid antenna system 10–11 with feed centers 12–13 alined in elevation and displaced in the azimuth plane to provide phase comparison of the signal reflected from the target. The feed centers 12–13 are connected to a magic tee 14 through paths 15–16 of equal length. It is desirable, but not essential that the relative axis of each antenna be adjusted so that if either antenna is oriented to point at the object, the opposite antenna be adjusted so that the relative phase of the reflected signal as seen at the electrical midpoint of the system, is ½ wavelength (180° elect.) apart. For the operating conditions herein examplified, with a spacing between the feed centers of 12⅜ inches (36λ) in the azimuth plane, a practical divergence angle between the antenna axis is 22 milli radians (approx. 1.25°).

The forms of the various pulses involved in the operation of the system are indicated by FIGS. 2 and 3. In considering these figures, it should be remembered that the time intervals between the voltage pulses of the different groups are not always to the same scale, some of the inter-pulse time intervals being very long as compared to others. For example, the repetition time of the transmitted double pulse $T_1$–$T_2$ (FIG. 2–N) is 250 microseconds which is very long as compared to the time intervals between the pulses of FIG. 2–E.

The transmitted signal (FIG. 2–N) consists of a pair of pulses which are of equal length and are separated by a time interval equal to the duration of one of the pulses. It is generated by a transmitter tube 18 which is under the control of a double-pulse modulator 20, this modulator being triggered by a timer 21 in a manner well understood by those skilled in the art and the pulse generated by the timer being indicated by FIG. 2–P. This transmitted signal may have a frequency of 35,000 mc./s., a pulse duration of 0.05 microsecond and a repetition frequency of 4000 p./s. With the radar system adjusted as indicated and scanned across a target, the echo signal generates sum and difference signals from the antenna system in the form indicated by FIG. 4. Under these conditions, the null or minimum of the difference signal $\Delta$ coincides with the peak of the sum signal $\Sigma$ as the electrical center line of the antenna system crosses the target point of origin.

The generation of the sum and difference signals occurs when the reflected signals are fed from the paraboloids 10–11 into the magic tee 14. Since the feed centers of the dual paraboloids are separated by a fixed distance in the azimuth plane, the signal voltages at the feed centers have the same magnitude. For small angles $\Theta$ between the direction of the target and the center line of the antenna system, these signal voltages have a phase difference proportional to the value of $\Theta$. The magnitude of the sum signal voltage $\Sigma$ from the output of the magic tee follows a cosine function of $\Theta$ and that of the difference signal voltage $\Delta$ follows a sine function.

When a target is on the center line of the antenna system, the sum signal voltage reaches a maximum while the difference signal voltage becomes a minimum. As indicated by FIG. 4, this null or minimum is in the form of a sharp point for point source type objects. Pointing accuracy of the radar system is measured by the shift of this difference voltage minimum point in azimuth from the azimuth of the target.

From the magic tee 14, the sum signal is fed through the duplexer or transmit-receive circuit 17 to a mixer 22 and the difference signal is fed directly from the magic tee to a mixer 23. These may be crystal type mixers. They function to combine the output of a local oscillator 24 with the sum and difference signals. The oscillator 24 is offset to provide single side band reception and is connected to the mixers through an adjustable attenuator 25. The oscillator in this case is not used to convert the carrier to a suitable intermediate frequency, but to offset or put the carrier on one edge of the IF amplifier pass band, thereby to cut off one side band of the double side band pulse modulation. The local oscillator is thus used to offset the converted and pulse-modulated carrier from the center frequency of the IF pass band. If the frequency of the transmitted pulses $T_1$ and $T_3$ is 35,000 megacycles per second as previously indicated, the frequency of the local oscillator is made such that the sum and difference signals appear at the outputs of the mixers 22 and 23 on a carrier having a frequency of either 50 or 70 megacycles per second. The oscillator frequency could thus be 35,050 or 35,070 mc. per second for a difference IF carrier frequency of 50 or 70 mc. per second. This puts the carrier on the lower or upper edge of the 20 mc. pass band which is centered on 60 mc. for the IF frequency and cuts off one half of the double sideband modulation.

From the mixers 22 and 23, the sum and difference signals are fed to intermediate frequency amplifiers 26 and 27 which are adjusted to pass a bandwidth of 20 megacycles per second centered at 60 megacycles per second. Depending on the number and location of the objects in the area scanned by the antenna system, the sum signal may be in the form indicated by FIG. 2–A' and the difference signal may be in the form indicated by FIG. 2–A.

The bandwidth of the IF amplifiers 26 and 27 is selected to provide summation of the two short pulse spectrums. This is accomplished by treating the sum of the time intervals of the two pulses $T_1$ and $T_3$ and that of the interval $T_2$ between them as a single equivalent pulse and establishing a matched bandwidth $$B = \frac{1}{T_1 + T_2 + T_3}$$

It can be seen that this bandwidth is very much narrower than that normally required to pass the single short pulse effectively. In this case, a bandwidth of 60 megacycles per second would be required, whereas the double pulse bandwidth is only 20 megacycles per second.

Two things are involved in handling the bandwidth and pulse configuration as indicated above. First, the short pulse spectrum is provided to allow the phase sensitivity of the aperture to exercise a considerable influence on the performance of the system. Second, the summation of the two pulses is required to provide the proper correlation for an output indicative of the position of a scanned object. The band pass of the system before the intermediate amplifiers is essentially broad band permitting the pulses arriving at the antenna to be phase compared in sequence.

For signals returned along the zero axis of the antenna system, all frequencies generated appear substantially in their original form. This occurs for both pulses from each target scanned. Signals not returned along the zero line of the antenna system has a different instantaneous phase error for each frequency in the spectrum. The energy symmetrically located about the center frequency of the spectrum would return signals causing loss of pointing accuracy except when the narrow band amplifiers are oriented with respect to the spectrum. To avoid this, an offset is provided similar to single side band reception. The difference is in the exact amount of offset with respect to the normal amount of offset used in single side band configurations. This offset is preferably on the order of the bandwidth of the IF amplifiers with respect to $f_0$ as indicated by FIG. 5. This places the first null of the double pulse spectrum in the approximate center of the narrow band amplifiers. The exact location of the narrow band of the amplifiers is obtained by adjusting the L.O. location for the best video signal and correct pointing characteristics in a controlled target situation, taking care not to include $f_0$ and its immediate frequency region within the IF band pass. A controlled target situation suitable for performing the desirable band pass orientation is as follows. Two reflecting objects of nearly equal size in the same range cell and within a single beam width and a third reflecting object at a different range.

It is our present understanding that in so arranging the relation between the net system bandwidth and extended signal spectrum, several interrelated factors function to materially assist in reducing the effects of clutter and improving pointing accuracy. The first of these factors can be appreciated from the fact that with extended clutter or objects, the return signal along the axis of the antenna approaches a constant wave located at $f_0$ (FIG. 5). In the case of random clutter, $f_0$ is randomly modulated. It is also significant that the double pulse $T_1$–$T_3$ (FIG. 2–N) provides a means of shifting some clutter components to $f_0$ by overlapping the independent clutter groups providing in essence a continuous wave again centered at $f_0$. Since the receivers reject $f_0$, the energy associated with it is excluded from the system output. The second factor is related to the statistical distribution of the clutter sources and the rate of phase change occurring at the sensing points due to transmitter inter pulse instability. The third factor is the inherent auto correlation due to the necessary double pulse coherence. This is available only along the electrical center line of the antenna. A fourth factor is by using the double pulse configuration, the transmitted spectrum is spread over a much greater frequency region. The present system is able to select echoes from random clutter backgrounds with a target returning energy of the order of $\frac{1}{100}$ of that required by conventional radars for the same detection ability. In addition, the accurate pointing ability greatly increases the usefulness of the limited aperture.

The transmission of the double pulse signal has the advantage that it greatly extends the usable frequency spectrum. This can be seen from a comparison between the single and double pulse systems. A single pulse system with a pulse duration of .05 microsecond requires a 20 megacycle receiving bandwidth for optimum reception. The same receiving system with a double pulse configuration has the characteristics of a system with three times the bandwidth insofar as the sensitivity to antenna orientation with respect to the phase plane of the receiving aperture is concerned. As utilized in the present system, this has the advantage of a greater degree of discrimination against off-axis signals. This has been abundantly proved by actual operation of the system.

Offsetting the local oscillator has the advantage that it doubles the effective intelligence bandwidth. A transmitter generating upper and lower side band signals is redundant in that the same intelligence appears in the two frequency regions. The associated receiving system with a centered local oscillator provides sufficient bandwidth to encompass both upper and lower side bands. Since the noise power of the receiving system is directly proportional to the bandwidth, a normal system with a given bandwidth provides only half the intelligence provided by the system with the offset local oscillator.

FIG. 2–B' indicates the form of the sum signals at the output of the amplifier 27 and FIG. 2–B that of the difference signals at the output of the amplifier 26. These signals are passed through detectors 28 and 29 which convert them to the form indicated by FIG. 2–C' and FIG. 2–C. From the detectors the signals are fed to a circuit 30 which provides at its output the resultant differences of the instantaneous sum and difference signals. These resultant differences X, Y and Z appear as indicated by FIG. 2–D. After clamping by a clamping circuit 31, they appear as indicated by FIG. 2–E. Thereafter they are fed through a video amplifier 32 to a video mixer 33 where they are combined with the unblank wave form (FIG. 3–J) as indicated by FIG. 3–F.

This mixer output pulse is produced in a manner well understood by those skilled in the art. Briefly stated, it is controlled by a synchronizing pulse (FIG. 3–M) which is applied from the double-pulse modulator 20 to a range delay circuit 41 which is under control of a handwheel 42. Rotation of this handwheel selects the portion of range to be presented on the vertical axis of the oscillograph. Coincident with the termination of the rundown wave form (FIG. 3–L) is the gate trigger pulse (FIG. 3–K) which is one of the outputs from circuit 41. The other output is used for range measurement. The gate trigger pulse (FIG. 3–K) is applied to a gate generator 43 which generates a gate pulse (FIG. 3–H'). This gate pulse is applied to a gate delay circuit 44 and an expanded sweep generator 45. From the gate delay circuit a delayed gate pulse (FIG. 3–H) is applied to the video mixer and from the expanded sweep generator 45 an expanded sweep wave form (FIG. 3–G) is applied to the vertical deflecting plates of the oscilloscope 46. The unblanking generator 47 is controlled by an output of the expanded sweep generator to produce a pedestal (FIG. 3–J) on which the delayed gate pulse and the sum and difference pulses X and Y (FIG. 3–F) are superimposed.

The cathode ray of the oscillograph 46 is moved vertically by the voltage wave form shown at FIG. 3–G and functions to scan the output (FIG. 3–F) of the video mixer 33 which is applied to the intensity modulation element of the oscillograph. As a result, there appears on the face of the oscillograph a representation of the pulses X and Y, each of which represents a different object in the field of view. In the absence of additional provisions, the representations would not contain relative azimuth information.

This difficulty is avoided by the provision of an antenna position reading circuit 48 which has an output voltage proportional to the antenna position. This voltage which varies as the antenna is scanning is connected to the horizontal plate of the oscillograph.

Associated with the oscillograph 46 are telescopic means 49 for simultaneously viewing the targets and the face of oscillograph. By collimating the beams reflected from the target and from the oscillograph, the radar system is brought to bear on the selected target, the representation of this target increasing in brightness as the central axis of the radar system is in alinement with it.

The oscillograph 46 and telescopic means 49 of FIG. 1 may be replaced by a cathode ray tube 50 (FIG. 6) which functions to combine the direct view of the target with that electrically produced on a transparent phosphor plate 51 located in the focal plane. The tube 50 has a filter 52 which rejects light of the same wavelength as that electrically generated by the phosphor 51. The cathode ray gun and deflecting electrodes of the tube 50 function in the same manner as those of the oscillograph 46. An anode 53 functions to accelerate the electrons as they approach the phosphor 51. In the operation of the tube 50, the optical image of the target is viewed through an image erecting system 54, the phosphor 51, the filter 52, an objective lens 55 and a photoelectric iris 56. The light beams reflected from the target and produced by the cathode ray of the tube 50 are collimated, as previously explained, to center the antenna system on the selected target. The use of the tube 50 has the advantage that it reduces the weight and simplifies the structure of the radar system.

Also well understood by those skilled in the art is the automatic frequency control system which functions to maintain a predetermined relation between the output frequencies of the transmitter tube and that of the local oscillator. The local oscillator 24 is illustrated as a Klystron tube which has a power supply 35 and means 36 for controlling its repeller voltage. The means for regulating this voltage include a mixer 37 which is connected to the output of the transmitter tube 18 through an adjustable attenuator 38 and to the output of the tube 24 through an adjustable attenuator 39. It also includes an automatic frequency control amplifier and detector 40 which receives the output of the mixer 37 and delivers its output to the repeller of the Klystron tube 24.

Experiment shows that the resultant spectrum is absolutely symmetrical when the two transmitted pulses are identical in every respect. Thus the plus and minus double pulse spectrum first nulls are equally displaced about the maximum amplitude region of the spectrum centered at $f_0$ (FIG. 5). However it is very difficult to produce this condition by actual modulation of the transmitter tube. The more normal effect is to experience an asymmetrical double pulse spectrum due to both a different pulse duration and a slightly different frequency between the two pulses. This effect is more of an advantage than a handicap since the resultant spread spectrum is of broader band width than that otherwise obtainable. Compensation is available; when the system is adjusted the mean average frequency of the carriers is in the band pass of the amplifiers. The systematic analysis of the various double pulse spectrums obtainable are so cumbersome as to almost defy comprehension. A few fundamental properties allow sufficient data to permit realizable equipment.

In FIG. 5, the solid line represents the resultant double pulse spectrum. If the pulse durations and the interpulse interval are equal and the pulse carriers are equal, the individual short pulse spectrum can be considered as the envelope 56 (FIG. 5) of the overall function. As the distance between the pair of pulses increases, many more spectrum lobes appear as indicated by FIG. 7. The overall short pulse spectrum, however still remains as the amplitude envelope for the entire resultant spectrum, being represented in FIG. 5 by the dash-dot line 57. The IF bandwidth (20 mc.) in its upper position above the center frequency $f_0$ is indicated with respect to the full double-pulse spectrum. With this system, the double pulse modulation is derived in a narrow band of 20 mc. Maximum use is made of the available full carrier bandwidth.

The radar of FIG. 8 differs from that of FIG. 1 in that the output of the transmitter tube 18 is applied to a ferrite duplexer or circulator 17'. In this case, the sum signal is transmitted to the difference circuit 30 through the circulator 17', a narrow band R.F. amplifier 61 and a crystal video detector 29'. The difference signal is similarly transmitted to the difference circuit 30 through a narrow band R.F. amplifier 60 and a crystal video detector 28'.

In the crystal video type receiver, the absence of the local oscillator requires that the R.F. band pass location with respect to the transmitted carrier signal, be appropriately adjusted as in the previously discussed single side band mode of operation. It is to be noted that the system of FIG. 8 is somewhat less complicated than that of FIG. 1.

I claim:

1. A radar system including signal generating means for operation in a range above the high-frequency band, means for modulating the output of said generating means to produce a signal consisting of a carrier amplitude-modulated by a pair of short pulses which are of equal length and are separated by a time interval equal to the time duration of one of said pulses, means including a phase sensitive antenna assembly comprising dual paraboloids with their feed centers at the same elevation and displaced from one another in azimuth for transmitting said signal to an object to be detected and for converting the reflected signal from said object to sum and difference carrier signals, a local oscillator, means for combining the output of said oscillator with each of said sum and difference signals to convert said signals to an intermediate frequency, a separate narrow-band intermediate-frequency amplifier connected for amplifying each of said converted sum and difference carrier signals, said oscillator having an operating frequency for offsetting the converted signals to one edge of the respective amplifier pass bands and said amplifiers having a band pass width which provides summation of the two short pulse spectrums and is small as compared with the converted modulated carrier band width, thereby to provide effective single side band amplification of said signals, means for combining the outputs of said amplifiers to produce a differential control signal, and means responsive to said control signal for indicating the position of said object with respect to the center line of said antenna assembly.

2. A radar system including carrier signal generating means for operation in a range above the high-frequency band, means for modulating the output of said generating means to produce a signal consisting of a carrier amplitude modulated by a pair of pulses of short substantially equal length and separated by a time interval equal to the duration of one of said pulses, means including a phase sensitive antenna assembly for transmitting said carrier signal to an object to be detected and for converting the reflected carrier signal from said object to sum and difference carrier signals, a local oscillator, means for combining the output of said oscillator with each of said sum and difference signals to convert said signals each to an intermediate frequency, a separate narrow band intermediate frequency amplifier connected for amplifying each of said converted sum and difference carrier signals, said oscillator having an operating frequency for offsetting the converted signals to one edge of the respective amplifier pass bands and said amplifiers each having a pass band width which provides summation of the two short pulse spectrums and is relatively narrow compared with the converted modulated carrier band width, thereby to provide effective single side band amplification of said signals, a detector connected with the output of each of said amplifiers, means for combining the output signals from said detectors to produce a differential control signal, and means responsive to said control signal for indicating the position of said object with respect to the center line of said antenna assembly.

3. A radar system as defined in claim 2, wherein the position-indicating means includes a light beam source providing a light beam indicative of said position of the object, and means for collimating the light beam from said source with a light beam reflected from said object.

References Cited by the Examiner
UNITED STATES PATENTS

| | | | |
|---|---|---|---|
| 2,479,458 | 8/49 | Barthelemy | 313—92 |
| 2,752,521 | 6/56 | Ivey | 313—92 |
| 2,830,288 | 4/58 | Dicke | 343—16 |
| 2,988,739 | 6/61 | Hoefer et al. | 343—16 |
| 3,044,057 | 7/62 | Thourel et al. | 343—7.7 |

CHESTER L. JUSTUS, *Primary Examiner.*